(12) United States Patent
Shigeta et al.

(10) Patent No.: US 7,305,309 B2
(45) Date of Patent: Dec. 4, 2007

(54) TRANSMISSION MEASURING SYSTEM WITH HIGH TIME RESOLUTION

(75) Inventors: Kunikazu Shigeta, Tokyo (JP);
Tamotsu Kobayashi, Kanagawa-Ken (JP)

(73) Assignees: Yugen-Kaisha Techno Data, Hachioji-shi (JP); Tokyo Keiso Kabushiki-Kaisha, Tokyo (JP)

( * ) Notice: Subject to any disclaimer, the term of this patent is extended or adjusted under 35 U.S.C. 154(b) by 0 days.

(21) Appl. No.: 11/318,998

(22) Filed: Dec. 27, 2005

(65) Prior Publication Data
US 2006/0145683 A1 Jul. 6, 2006

(30) Foreign Application Priority Data
Dec. 27, 2004 (JP) ............... 2004-375406
Sep. 30, 2005 (JP) ............... 2005-285851

(51) Int. Cl.
*G01F 1/66* (2006.01)
(52) U.S. Cl. ............... 702/48; 702/45; 702/54; 73/861.27; 73/861.18; 73/861.03
(58) Field of Classification Search ........... 702/48, 702/79, 89, 125
See application file for complete search history.

(56) References Cited

U.S. PATENT DOCUMENTS

| | | | |
|---|---|---|---|
| 4,633,715 A | 1/1987 | Monchalin | |
| 5,650,571 A * | 7/1997 | Freud et al. | 73/861.06 |
| 5,844,139 A * | 12/1998 | Miller et al. | 73/602 |
| 5,920,897 A * | 7/1999 | Jin et al. | 711/167 |
| 5,964,708 A * | 10/1999 | Freeman et al. | 600/447 |
| 6,151,558 A * | 11/2000 | Conant et al. | 702/48 |
| 6,305,223 B1 | 10/2001 | Matsumoto et al. | |
| 6,305,233 B1 * | 10/2001 | Braathen et al. | 73/861.28 |
| 6,622,572 B2 | 9/2003 | Kobayashi et al. | 73/861.29 |
| 6,647,805 B2 | 11/2003 | Kobayashi et al. | 73/861.27 |
| 6,806,623 B2 * | 10/2004 | Petersen et al. | 310/334 |
| 6,875,178 B2 * | 4/2005 | Phelps et al. | 600/447 |
| 2002/0011119 A1 * | 1/2002 | Bignell et al. | 73/861.23 |

FOREIGN PATENT DOCUMENTS

| | | |
|---|---|---|
| JP | 2002/162269 A | 6/2002 |
| JP | 2002/296085 A | 10/2002 |
| JP | 2002-340641 A | 11/2002 |

* cited by examiner

*Primary Examiner*—Hal Wachsman
(74) *Attorney, Agent, or Firm*—Frishauf, Holtz, Goodman & Chick, P.C.

(57) ABSTRACT

A transmission measuring system includes a subject for transmission measurement for outputting, in response to a start signal for measurement from a central processing unit, an output signal including information on a transmission time to be measured. An analog-digital converter converts the output signal into digital data. The central processing unit processes the digital data to obtain the transmission time required for propagating the signal through the subject. A clock signal source provides a clock signal to the central processing unit, and a variable delay unit is interposed between the clock signal source and the analog-digital converter. The central processing unit delivers a delay time control signal to the variable delay unit so that the delay time of the clock signal of the analog-digital converter may be varied with time relative to the start signal for measurement.

3 Claims, 4 Drawing Sheets

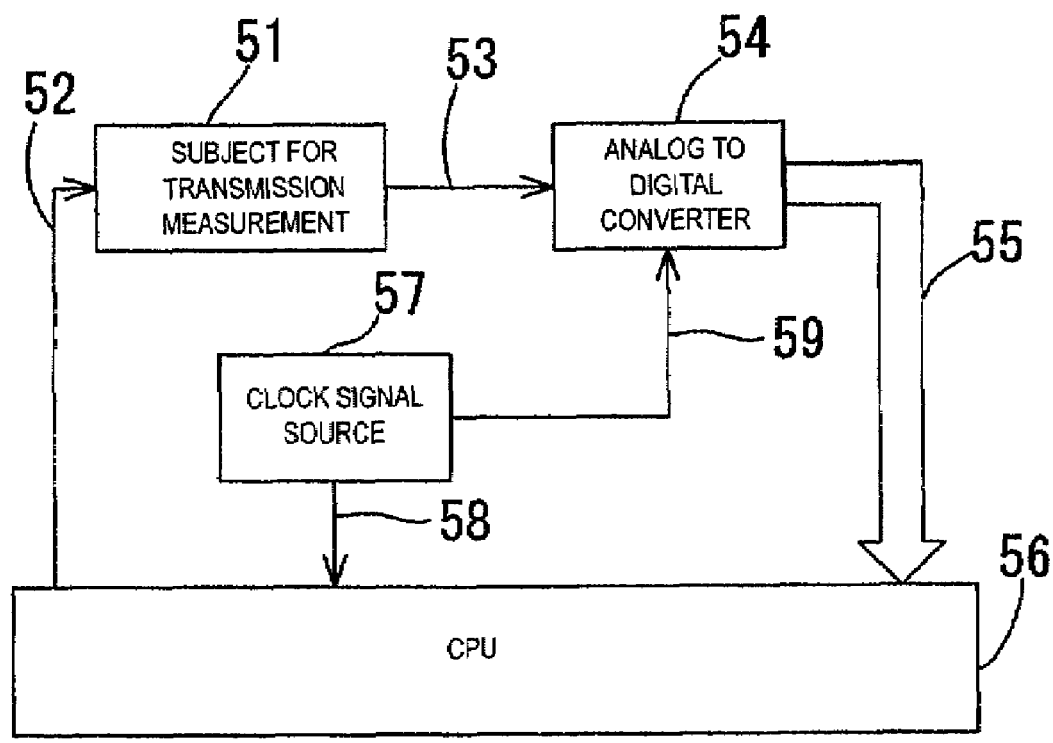

TRANSMISSION MEASURING SYSTEM WITH HIGH TIME RESOLUTION

BACKGROUND OF THE INVENTION

The present invention relates to a system employed in a variety of measuring equipments for measuring the time required for transmitting signals through the subject to be measured.

DESCRIPTION OF THE PRIOR ART

There are various kinds of measuring equipments for obtaining an intended physical property from the transmission time of the signal transmitted through the subject to be measured.

For example, there is an ultrasonic flow meter for obtaining the flow rate of the fluid on the basis of the difference between the propagation times in the up-stream ward and the down-stream ward directions.

Exemplary equipments of these kinds are disclosed in Japanese Patent Laid-Open Public Disclosure 2002-162269 (Pages 1-6 and FIGS. 1-7) and Japanese Patent Laid-Open Public Disclosure 2002-296085 (Pages 1-5 and FIGS. 1-6), the disclosures of each of these publication are incorporated by reference herein in their entireties).

The measuring equipments of the above mentioned kinds are often provided with an apparatus for measuring the signal transmission time such as that illustrated in FIG. 5.

The arrangement of the ultrasonic flow meter of the prior art will now be described with reference to FIG. 5.

In FIG. 5, reference numeral 51 indicates a subject for transmission measurement, which corresponds with a means for transmitting and receiving the ultrasonic wave of the above-mentioned ultrasonic flow meter. In the subject for transmission measurement, a signal is generated upon receiving the start signal for measurements 52, and signal 53 including information on the transmission time is then output analog-digital converter 54.

The analog-digital converter 54 transforms the input analog signal into digital data and outputs the digital data to the path 55. The central processing unit (CPU) 56 then processes the digital data to provide the transmission time.

The CPU 56 and the analog-digital converter 54 are adapted to operate on the basis of the clock signals 58 and 59 from clock signal source 57.

In the above mentioned transmission measuring system of the prior art the clock signal of the analog-digital converter 54 is synchronized with the start signal for measurements 52 of the subject for transmission measurement so that the time resolution of the transmission time calculated through the central processing unit 56 can not be enhanced over the frequency of the clock signal. In other words, the time resolution of the transmission time depends on the performance of the analog-digital converter.

When it is intended to enhance the time resolution, the analog-digital converter of high maximum sampling frequency is required. However, this solution will also increase the cost of the system.

SUMMARY OF THE INVENTION

In order to solve the above mentioned problem transmission measuring system of the first embodiment of the present invention comprises a subject for transmission measurement for outputting in response to a signal from the central processing unit an output signal including an information on the transmission time to be measured, analog-digital converter for converting the output signal into digital data, a central processing unit for processing the digital data to obtain the transmission time required for propagating the signal through the subject, a clock signal source for providing clock signal to said central processing unit, and a variable delay unit interposed between the clock signal source and the analog-digital converter for delaying the clock signal from the clock source and delivering thus delayed signal into the analog-digital converter, wherein the central processing unit delivers a delay time control signal to the variable delay unit so that the delay time of the clock signal of the analog-digital converter may be varied with time relative to the start signal for measurement.

The variable delay unit comprises a programmable delay module including a plurality of delay output taps and a multiplexer for selecting any one of the taps.

The variable delay unit is a voltage variable active delay element.

The transmission measuring system of the second embodiment of the present invention comprises a pair of ultrasonic transducers, each of which is mounted on up-stream and down stream regions of a flow tube respectively, a switching device for switching the operational mode of each of the transducers alternatively to its transmitting or receiving mode, a driving power source for driving the ultrasonic transducers, and an amplifier for amplifying the signal propagated through fluid in the flow tube and received by the ultrasonic transducer of the receiving mode; an analog-digital converter for converting the output from the amplifier into digital data; a programmable logic device for receiving the digital data and storing the data in a memory; a clock source for providing clock signal to the programmable logic device; and a central processing unit for reading out the information stored in the memory and processing the information to obtain the propagation time in the up-stream ward direction and the propagation time in the down-stream ward direction and to compute the flow rate of the fluid flowing through the flow tube on the basis of the difference between the propagation times, wherein the programmable logic device delivers start signal for measurements to the driving power source on the basis of the clock signal from the clock signal source, generates a plurality of delayed clock signals through the internal element, delivers the one of the delayed signals to the analog-digital converter, and changes the delay time of the clock signal to be delivered to the analog-digital converter with time with respect to the start signal for measurements.

The transmission measuring system of the third embodiment of the present invention comprises a pair of ultrasonic transducers, each of which is mounted on up-stream and down stream regions of a flow tube respectively, a switching device for switching the operational mode of each of the transducers alternatively to its transmitting or receiving mode, a driving power source for driving the ultrasonic transducers, and an amplifier for amplifying the signal propagated through fluid in the flow tube and received by the ultrasonic transducer of the receiving mode; an analog-digital converter for converting the output from the amplifier into digital data; a programmable logic device for receiving the digital data and storing the data in a memory; a clock source for providing clock signal to the programmable logic device; and a central processing unit for reading out the information stored in the memory and processing the information to obtain the propagation time in the up-stream ward direction and the propagation time in the down-stream ward direction and to compute the flow rate of the fluid flowing through the flow tube on the basis of the difference between the propagation times, wherein the programmable logic device delivers clock signal to the analog-digital converter on the basis of the clock signal from the clock signal source, generates a plurality of delayed clock signals through the internal element thereof, delivers the one of the delayed signals to the driving power source as a start signal for measurements, and changes the clock signal to be delivered to the analog-digital converter with time with respect to the start signal for measurements.

The transmission measuring system of the fourth embodiment of the present invention comprises a pair of ultrasonic transducers, each of which is mounted on up-stream and down stream regions of a flow tube respectively, a switching device for switching the operational mode of each of the transducers alternatively to its transmitting or receiving mode, a driving power source for driving the ultrasonic transducers, and an amplifier for amplifying the signal propagated through fluid in the flow tube and received by the ultrasonic transducer of the receiving mode; an analog-digital converter for converting the output from the amplifier into digital data; a programmable logic device for receiving the digital data and storing the data in a memory; a clock source for providing clock signal to the programmable logic device; and a central processing unit for reading out the information stored in the memory and processing the information to obtain the propagation time in the up-stream ward direction and the propagation time in the down-stream ward direction and to compute the flow rate of the fluid flowing through the flow tube on the basis of the difference between the propagation times, wherein the programmable logic device receives the clock signal from the clock signal source, generates a plurality of delayed clock signals through the internal element thereof, delivers the one of the delayed signals to the driving power source as a start signal for measurements, delivers the identical or different delayed clock signal to the analog-digital converter as a clock signal based on which the converter is to be operated, and changes the clock signal to be delivered to the analog-digital converter with time with respect to the start signal for measurements.

As can be seen from the above, a sufficiently high time resolution can be achieved and an accurate measurement can be effected by a part of relatively low price instead of the analog-digital converter of high maximum sampling frequency. Thus, an industrially advantageous transmission measuring system can be obtained.

BRIEF DESCRIPTION OF THE DRAWINGS

Further feature of the present invention will become apparent to those skilled in the art to which the present invention relates from reading the following specification with reference to the accompanying drawings, in which:

FIG. 5 is a block diagram showing the transmission measuring system of the prior art.

DETAILED DESCRIPTION OF THE PRESENT INVENTION

An embodiment of the transmission measuring system in accordance with the present invention will now be described with reference to a concrete example illustrated in the attached drawings.

Figure 1:
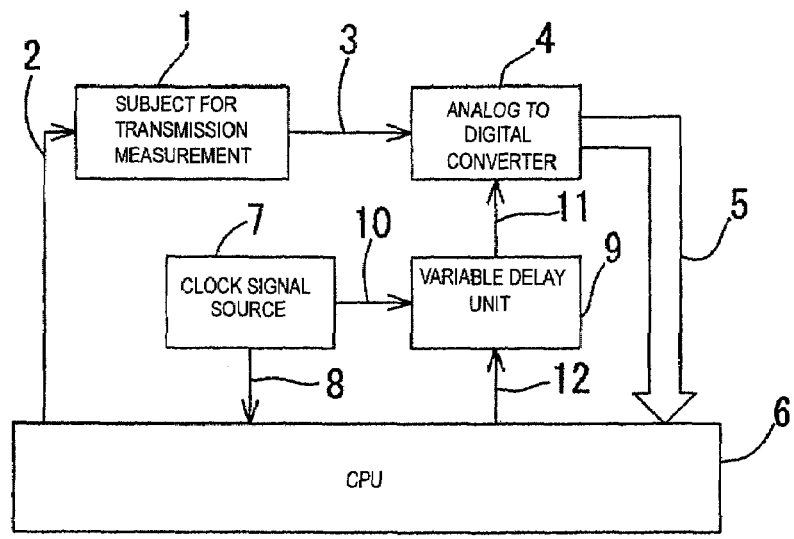
FIG. 1 is a block diagram showing the transmission measuring system in accordance with the present invention.

A subject for transmission measurement is designated in FIG. 1 by reference numeral 1. When a start signal for measurement 2 is input thereto, analog signal 3 including information on the transmission time is output after the transmission time to be measured has elapsed.

The analog signal 3 obtained in this manner is adapted to be converted through analog-digital converter 4 into digital data and delivered to a central processing unit (CPU) 6.

Reference numeral 7 designates a clock signal source, which is normally formed by a crystal oscillator. An output 8 of the clock signal source may be delivered to the CPU 6 to enable the normal operation of thereof.

The CPU 6 delivers the start signal for measurement 2 in a suitable interval in synchronization with the clock signal.

The clock signal source 7 may also output clock signal 10 to a variable delay unit 9. Then the variable delay unit 9 delays the input clock signal 10 to generate a delayed clock signal 11. The delayed clock signal is delivered to the analog-digital converter 4 for assuring the normal operation of the converter 4.

The CPU 6 delivers a delay time control signal 12 to the variable delay unit 9 to control the delay time of the delayed clock signal. It is suitable for selecting the changing cycle of the delay time control signal 12 so that it is longer than the delay time of the variable delay unit 9 and shorter than the transmission time to be measured.

In the transmission measuring system of the present invention arranged as described above, the clock signal on which the analog-digital converter 4 is operated is delayed in time with respect to the start signal for measurement 2. That is, the pulse phase between the two signals is changed with time, and thus the time resolution of the transmission time calculated by the CPU 6 on the basis of the digital data is reduced to a fraction of the frequency of the clock signal. Thereby, the accuracy of the measurement will surely be enhanced remarkably.

A concrete example of the variable delay unit 9 will now be described with reference to FIG. 2.

Figure 2:
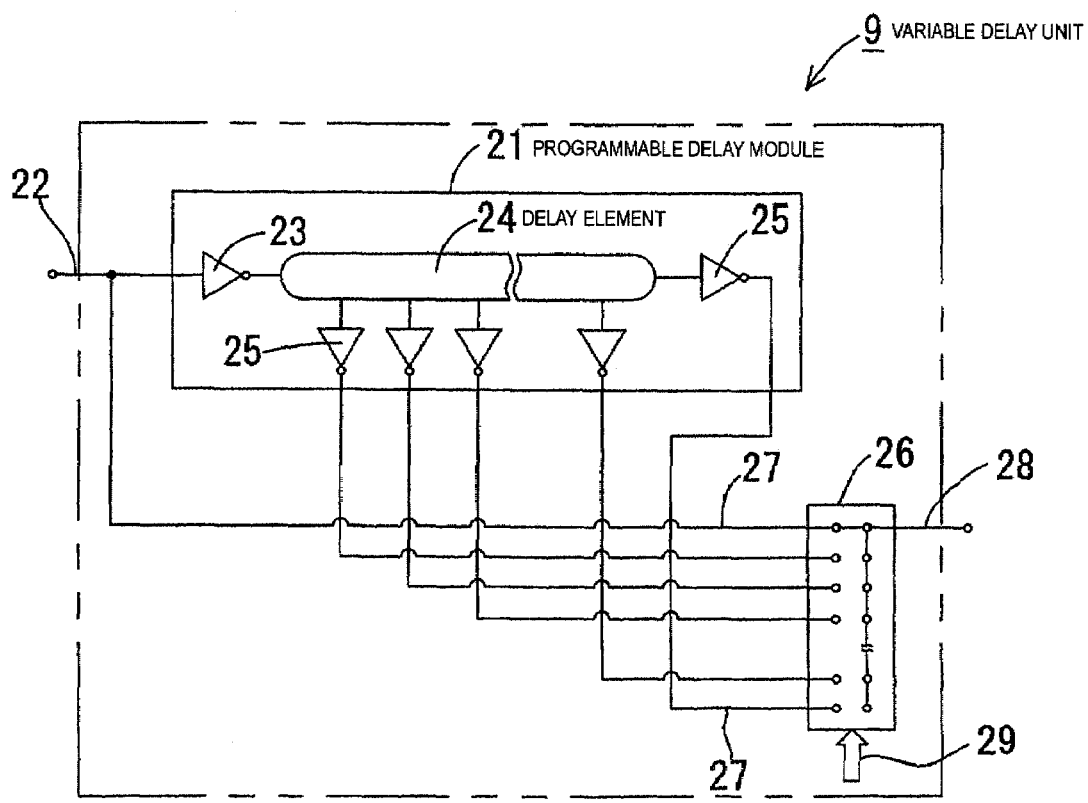
FIG. 2 is a diagram showing one example of the variable delay unit.

Reference numeral 21 in FIG. 2 designates a programmable delay module which is adapted to operate under a normal clock signal.

In FIG. 2, reference numeral 22 designates an input clock signal (corresponding to input clock signal 10) reference numeral 23 designates a wave-form shaping inverter for input, reference numeral 24 designates a delay element, reference numeral 25 designates a wave-form shaping inverter for output, reference numeral 26 designates a multiplexer, reference numeral 27 designates a variety of delay clock outputs, reference numeral 28 designates one of the variety of delay clock outputs, and reference numeral 29 designates a selecting signal.

The output 28 is adapted to be delivered to the analog-digital converter 4 and a delay time control signal 29 (corresponding to the delay time control signal 12) from the CPU is adapted to be delivered to the multiplexer 26 as described above. Thus, the delay unit can obtain the same effect or effects described above.

In another concrete example, a variable delay unit employing a variable capacity diode on the market can also be used as the variable delay unit 9. In such a delay unit, the clock input can be delayed and output, and the delay time can be varied by the direct current to be added to the variable capacity or by the low frequency signal.

The same effect or effects as obtained in the above mentioned embodiment could also be achieved by delivering the direct current or the low frequency signal from the CPU.

A second embodiment of the transmission measuring system in accordance with the present invention will now be described with reference to a concrete example illustrated in FIG. 3.

Figure 3:
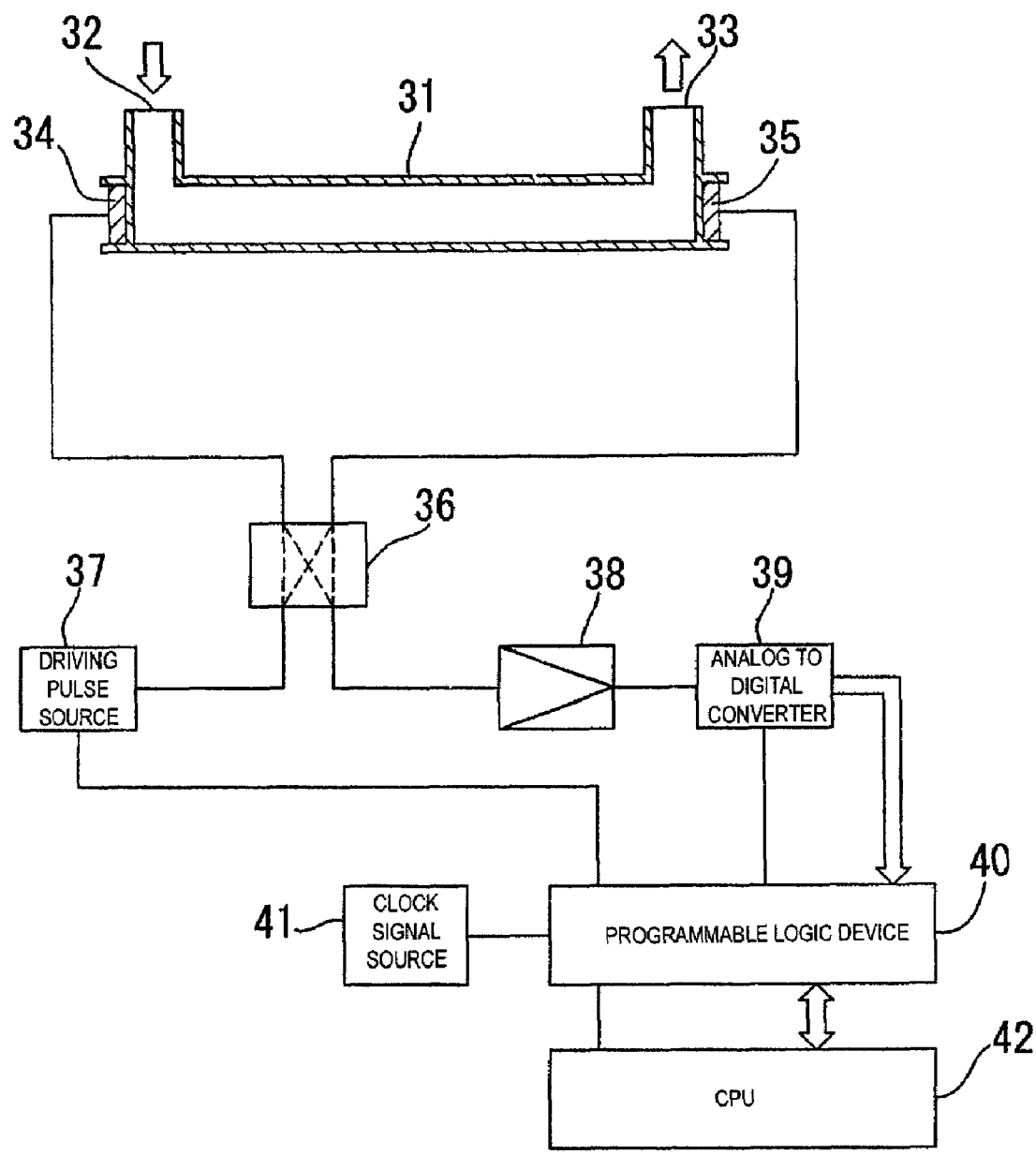
FIG. 3 is a block diagram showing the transmission measuring system of the other embodiment of the present invention.

In FIG. 3, reference numeral 31 designates a flow tube, reference numeral 32 designates an inlet of fluid to be measured, reference numeral 33 designates an outlet of the fluid, reference numerals 34 and 35 designate a pair of ultrasonic transducers, and reference numeral 36 designates a switching device for switching the operational mode of each of the transducers alternatively to a transmitting or receiving mode thereof.

A concrete description on the signal for causing switching is omitted, since a variety of techniques can be used in switching the signal.

In the transmission measuring system with the structure shown in FIG. 3, one of the transducers is driven through high voltage and the other one picks the ultrasonic wave propagated through the fluid to be measured. The received wave, which includes information on the transmission time (this will be referred hereinafter to as the propagation time with respect to the time regarding the ultrasonic wave), is amplified by an amplifier 38 and input to an analog-digital converter 39.

The received wave will then be converted through an analog-digital converter 39 into digital data. These data are to be stored in the internal memory of a programmable logic device 40.

Reference numeral 41 designates a clock signal source, which is normally formed by a crystal oscillator.

The programmable logic device 40 generates a start signal for measurement synchronized with the clock signal provided by a clock signal source 41, and delivers the start signal to the driving pulse source 37.

A CPU 42 reads out and processes the information stored in the memory of the programmable logic device to obtain the times required for propagating the ultrasonic wave between the pair of ultrasonic transducers in the up-stream ward and the down-stream ward directions to compute the flow rate of the fluid flowing through the flow tube.

The clock signal from the clock source 41 is delayed diversely through a plurality of elements such as gates or delay lines in the programmable logic device 40 to generate a plurality of delayed clock signals.

One of the delayed clock signals may be supplied to the analog-digital converter 39.

In the transmission measuring system with the structure shown in FIG. 3, the clock signal on which the analog-digital converter 39 is operated is delayed in time with respect to the start signal for measurement. That is, the pulse phase between the signals is changed with time, and thus the time resolution of the propagation time calculated by the CPU 42 on the basis of the digital data is enhanced to a fraction of the frequency of the clock signal.

The enhancement of the resolution will be described with reference to FIG. 4.

The signal for driving the transducer is illustrated in (a).

The waveform of the received signal is illustrated in (b).

"Tp" dsignates a propagation time. When it is intended to obtain the Tp, the time T for the suitably selected zero-cross point (indicated by a closed dot in part (b) of FIG. 4) is measured accurately, and then the time to measure from the onset of the wave form to the zero-cross point is subtracted from the time T.

The operation of the transmission measuring system will be described.

The waveform of the clock signal is illustrated in (c).

The waveform (clock signal) delayed by $\tau 1$ with respect to the wave form illustrated in (c) is illustrated in (d).

The analog-digital converter 39 converts the received wave form on the basis of the clock signal illustrated in (c) to obtain the value of digital data designated by open circles plotted on the received wave form illustrated in (e), and converts the received wave form on the basis of the clock signal illustrated in (d) to obtain the value of digital data designated by crosses (x's) plotted on the received wave form illustrated in (e).

The CPU 42 reads out a plurality of data near the zero-cross point, and estimates the zero-cross point by processing the data through the method of least squares or other improved method for calculation.

Thus the propagation time can be obtained by the above-mentioned subtraction, and the flow rate of the fluid can also be obtained therefrom.

Figure 4:
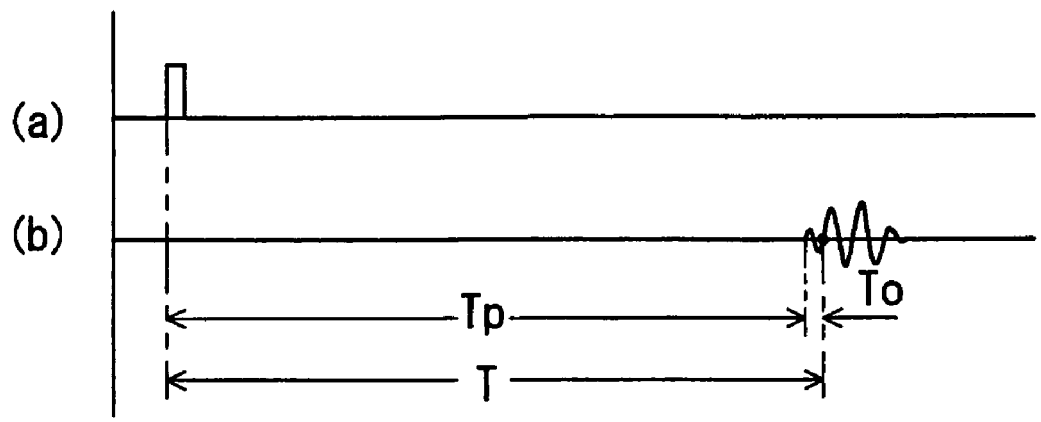
FIG. 4 is a graph showing the operation of the transmission measuring system of the present invention.
Figure 4:
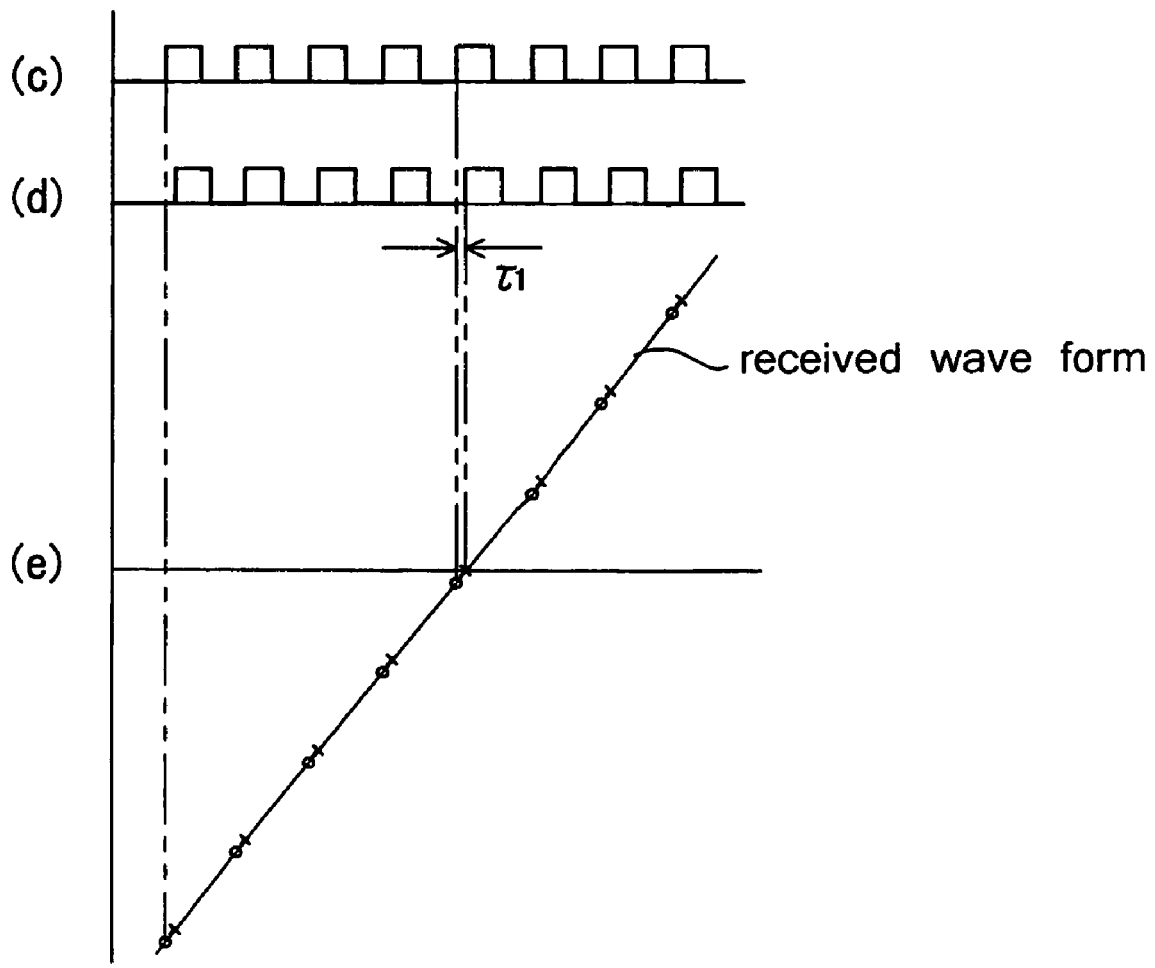

However, the zero-cross point obtained from the data designated by open circles in part (e) of FIG. 4 is generally different from the zero-cross point obtained from data designated by crosses (x's) in part (e) of FIG. 4, since the received wave form is not linear.

In the method of the present invention, the zero-cross point depends on the number of variation of the delay time, since the delay time is varied with respect to the time.

In this connection measured results having good time resolution can be obtained through the statistical process such as the method of average.

In the measuring system of the prior art, only one zero-cross point can be obtained on the basis of the data designated by open circles in part (e) corresponding to the clock signal of (c) in FIG. 4, as long as the propagation time is constant.

In other words, the measuring system of the prior art cannot achieve time resolution as high as the time resolution achieved using the system of the present invention.

Although the system of FIG. 1 and the system of FIG. 3, appear to be different in their arrangements, these systems are substantially identical, since the programmable logic device 40 cooperates with the CPU 42 to support the peripheral function thereof, and the device 40 also serves as a variable delay unit.

The measuring system of this embodiment is advantageous in its cost since no delay elements are employed.

Examples on the rated value of the parts are as follows:

The ultrasonic oscillator: resonant frequency of 1-2 Mc;

The analog-digital converter 39: sampling frequency of 40-50 Ms/s;

The programmable logic device 40: gate delay time of 1 ns.

The combination of these primary parts will provide the time resolution of 50 ps.

A third embodiment of the transmission measuring system in accordance with the present invention will now be described with reference to FIG. 3.

In this description, only the difference from the system of the second embodiment will be set forth.

According to the third embodiment, the programmable logic device 40 receives a clock signal from the clock signal source 41, generates a clock signal synchronized with the clock signal provided by the source 41, delivers the clock signal obtained in this manner to the analog-digital converter 39, generates a plurality of delayed clock signals by means of a plurality of elements such as gates or delay lines included therein, and delivers one of the delayed clock signals to the driving power source 37.

As can be seen from the above, the only difference in the third embodiment from the system of the second embodiment is that the analog-digital converter 39 and the driving power source 37 are changed with each other (with respect to which one receives the clock signal synchronized with the clock signal from the clock signal source 41 and which one receives the delayed clock signal), so that the same effect as that obtained from the system of the second embodiment can also be obtained.

A fourth embodiment of the transmission measuring system in accordance with the present invention will now be described with reference to FIG. 3.

In this description, only the difference from the system of the second embodiment will be set forth.

According to the fourth embodiment, the programmable logic device 40 receives a clock signal from the clock signal source 41, generates a plurality of delayed clock signals by means of a plurality of elements such as gates or delay lines included therein, delivers one of the delayed clock signals to the driving power source 37, and delivers either the identical delayed clock signal or a different delayed clock signal to the analog-digital converter 39 as a clock signal.

The transmission measuring system of this embodiment is the same as that of the second or third system in that the clock pulse signal of the analog-digital converter will be varied with time.

The system of the fourth embodiment is more suitable for the statistical processing since the number of change of the phase can be obtained by the product of the number of change of the start signal for measurement and the number of change of the clock signal of the analog-digital converter.

While particular embodiments of the present invention have been illustrated and described, it should be obvious to those skilled in the art that various changes and modifications can be made without departing from the spirit and scope of the invention.

What is claimed is:

1. A transmission measuring system comprising:
   (a) a pair of ultrasonic transducers, respectively mounted on upstream and downstream regions of a flow tube, a switching device for switching an operational mode of each of the transducers alternatively to a transmitting and a receiving mode thereof such that a first one of the pair of transducers is first set in the transmitting mode then in the receiving mode and a second one of the pair of transducers is first set in the in the receiving mode and then set in the transmitting mode, a driving power source for driving the ultrasonic transducers such that a signal is propagated through fluid in the flow tube from the first ultrasonic transducer to the second ultrasonic transducer and such that a signal is propagated through the fluid in the flow tube from the second ultrasonic transducer to the first ultrasonic transducer, whereby a signal is propagated between the ultrasonic transducers in each of an upstream-ward direction and a downstream-ward direction in the flow tube, and an amplifier which, for each said signal propagated through the fluid and received by one of the ultrasonic transducers in the receiving mode, amplifies the signal propagated through fluid in the flow tube and received by the ultrasonic transducer in the receiving mode;
   (b) an analog-digital converter which, for each of the signals output from the amplifier, converts the amplified signal into digital data;
   (c) a programmable logic device for receiving the digital data for each of the amplified signals and storing the received digital data in a memory;
   (d) a clock source for providing a clock signal to the programmable logic device; and
   (e) a central processing unit for reading out the digital data stored in the memory and processing the read out digital data to obtain a propagation time of the signal propagated in the upstream-ward direction of the flow tube and a propagation time of the signal propagated in the downstream-ward direction of the flow tube and to compute a flow rate of the fluid flowing through the flow tube based on a difference between the propagation times,
   wherein the programmable logic device delivers a start signal for measurements to the driving power source based on the clock signal from the clock signal source, generates a plurality of delayed clock signals through an internal element thereof, delivers one of the delayed clock signals to the analog-digital converter, and changes a delay time of the clock signal to be delivered to the analog-digital converter with time with respect to the start signal for measurements.

2. A transmission measuring system comprising:
   (a) a pair of ultrasonic transducers, respectively mounted on upstream and downstream regions of a flow tube, a switching device for switching an operational mode of each of the transducers alternatively to a transmitting and a receiving mode thereof such that a first one of the pair of transducers is first set in the transmitting mode then in the receiving mode and a second one of the pair of transducers is first set in the in the receiving mode and then set in the transmitting mode, a driving power source for driving the ultrasonic transducers such that a signal is propagated through fluid in the flow tube from the first ultrasonic transducer to the second ultrasonic transducer and such that a signal is propagated through the fluid in the flow tube from the second ultrasonic transducer to the first ultrasonic transducer, whereby a signal is propagated between the ultrasonic transducers in each of an upstream-ward direction and a downstream-ward direction in the flow tube, and an amplifier which, for each said signal propagated through the fluid and received by one of the ultrasonic transducers in the receiving mode, amplifies the signal propagated through fluid in the flow tube and received by the ultrasonic transducer in the receiving mode;
   (b) an analog-digital converter which, for each of the signals output from the amplifier, converts the amplified signal into digital data;
   (c) a programmable logic device for receiving the digital data for each of the amplified signals and storing the received digital data in a memory;
   (d) a clock source for providing a clock signal to the programmable logic device; and
   (e) a central processing unit for reading out the digital data stored in the memory and processing the read out digital data to obtain a propagation time of the signal propagated in the upstream-ward direction of the flow tube and a propagation time of the signal propagated in the downstream-ward direction of the flow tube and to compute a flow rate of the fluid flowing through the flow tube based on a difference between the propagation times, wherein the programmable logic device delivers a clock signal to the analog-digital converter based on the clock signal from the clock signal source, generates a plurality of delayed clock signals through an internal element thereof, delivers one of the delayed clock signals to the driving power source as a start signal for measurements, and changes the clock signal to be delivered to the analog-digital converter with time with respect to the start signal for measurements.

3. A transmission measuring system comprising:

(a) a pair of ultrasonic transducers, respectively mounted on upstream and downstream regions of a flow tube, a switching device for switching an operational mode of each of the transducers alternatively to a transmitting and a receiving mode thereof such that a first one of the pair of transducers is first set in the transmitting mode then in the receiving mode and a second one of the pair of transducers is first set in the in the receiving mode and then set in the transmitting mode, a driving power source for driving the ultrasonic transducers such that a signal is propagated through fluid in the flow tube from the first ultrasonic transducer to the second ultrasonic transducer and such that a signal is propagated through the fluid in the flow tube from the second ultrasonic transducer to the first ultrasonic transducer, whereby a signal is propagated between the ultrasonic transducers in each of an upstream-ward direction and a downstream-ward direction in the flow tube, and an amplifier which, for each said signal propagated through the fluid and received by one of the ultrasonic transducers in the receiving mode, amplifies the signal propagated through fluid in the flow tube and received by the ultrasonic transducer in the receiving mode;

(b) an analog-digital converter which, for each of the signals output from the amplifier, converts the amplified signal into digital data;

(c) a programmable logic device for receiving the digital data for each of the amplified signals and storing the received digital data in a memory;

(d) a clock source for providing a clock signal to the programmable logic device; and (e) a central processing unit for reading out the digital data stored in the memory and processing the read out digital data to obtain a propagation time of the signal propagated in the upstream-ward direction of the flow tube and a propagation time of the signal propagated in the downstream-ward direction of the flow tube and to compute a flow rate of the fluid flowing through the flow tube based on a difference between the propagation times, wherein the programmable logic device receives the clock signal from the clock signal source, generates a plurality of delayed clock signals through an internal element thereof, delivers one of the delayed clock signals to the driving power source as a start signal for measurements, delivers one of an identical delayed clock signal and a different delayed clock signal to the analog-digital converter as a clock signal based on which the analog-digital converter is to be operated, and changes the clock signal to be delivered to the analog-digital converter with time with respect to the start signal for measurements.

* * * * *